United States Patent
Fisher

(10) Patent No.: US 8,216,683 B2
(45) Date of Patent: Jul. 10, 2012

(54) INTERLAYERS COMPRISING STABILIZED TUNGSTEN OXIDE AGENTS

(75) Inventor: William Keith Fisher, Suffield, CT (US)

(73) Assignee: Solutia Inc., St. Louis, MO (US)

(*) Notice: Subject to any disclaimer, the term of this patent is extended or adjusted under 35 U.S.C. 154(b) by 0 days.

(21) Appl. No.: 11/833,480

(22) Filed: Aug. 3, 2007

(65) Prior Publication Data

US 2009/0035583 A1 Feb. 5, 2009

(51) Int. Cl.
*B32B 17/10* (2006.01)
*B32B 27/42* (2006.01)
*C08K 5/34* (2006.01)

(52) U.S. Cl. ........ 428/437; 428/436; 428/441; 428/442; 524/91; 524/92; 524/406

(58) Field of Classification Search .................. 428/437, 428/441, 442, 436; 524/91, 92, 406
See application file for complete search history.

(56) References Cited

U.S. PATENT DOCUMENTS

| | | | |
|---|---|---|---|
| 4,027,069 A | 5/1977 | Mont | |
| 5,145,744 A | 9/1992 | Cartier | |
| 5,225,273 A | 7/1993 | Mikoshiba | |
| 5,427,842 A | 6/1995 | Bland | |
| 5,792,560 A | 8/1998 | Friedman | |
| 5,830,568 A | 11/1998 | Kondo | |
| 6,315,848 B1 | 11/2001 | Kondo | |
| 6,329,061 B2 | 12/2001 | Kondo | |
| 6,500,915 B1 | 12/2002 | Fujimori | |
| 6,579,608 B1 | 6/2003 | Kondo | |
| 6,673,456 B1 * | 1/2004 | Kobata et al. | 428/437 |
| 7,160,624 B2 * | 1/2007 | Fukatani et al. | 428/437 |
| 2003/0144459 A1 | 7/2003 | Fujimori | |
| 2005/0068648 A1 | 3/2005 | Yoshikai | |
| 2005/0252410 A1 | 11/2005 | Bujard | |
| 2006/0008640 A1 | 1/2006 | Chonan | |
| 2006/0050425 A1 | 3/2006 | Muromachi | |
| 2006/0178254 A1 | 8/2006 | Takeda | |
| 2006/0216485 A1 | 9/2006 | Lin | |
| 2006/0251996 A1 | 11/2006 | Bogerd | |

FOREIGN PATENT DOCUMENTS

| | | |
|---|---|---|
| EP | 1 640 348 | 3/2006 |
| EP | 1 724 110 | 11/2006 |
| WO | WO 2005/037932 | 4/2005 |
| WO | WO 2005/068207 | 7/2005 |
| WO | WO 2006/102198 | 9/2006 |
| WO | WO 2007/130773 A | 11/2007 |
| WO | WO 2009/020806 A1 | 2/2009 |

OTHER PUBLICATIONS

Notification of Transmittal of the International Search Report and the Written Opinion of the International Searching Authority, or the Declaration, International Application No. PCT/US2008/071527, Date of Mailing Oct. 7, 2008.

International Preliminary Report on Patentability from PCT/US2008/071527, dated Feb. 9, 2010.

* cited by examiner

*Primary Examiner* — D. S. Nakarani

(74) *Attorney, Agent, or Firm* — Lewis, Rice & Fingersh, L.C.

(57) ABSTRACT

The present invention includes polymer interlayers that are used in multiple layer glazing panels. Interlayers of the present invention comprise a thermoplastic polymer, a plasticizer, a tungsten oxide agent, and a stabilizing agent that prevents the degradation of the tungsten oxide agent. Interlayers incorporating such components have improved ultraviolet light blocking character, and also maintain optical quality over time.

16 Claims, No Drawings

INTERLAYERS COMPRISING STABILIZED TUNGSTEN OXIDE AGENTS

FIELD OF THE INVENTION

The present invention is in the field of multiple layer glazing panel interlayers and, more specifically, the present invention is in the field of multiple layer glazing panel interlayers comprising stabilized tungsten oxide agents.

BACKGROUND

Poly(vinyl butyral) (PVB) is commonly used in the manufacture of polymer layers that can be used as interlayers in light-transmitting laminates such as safety glass or polymeric laminates. Safety glass often refers to a transparent laminate comprising a plasticized poly(vinyl butyral) interlayer disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

Interlayers often comprise, in addition to their polymeric component, various agents that function to alter the spectrum of radiation that is transmitted through the finished glazing product. Those agents, however, often are unstable or cause undesirable effects in a finished laminate.

What are needed in the art are interlayers that are formulated in a manner so that desirable agents are stably maintained without impacting other characteristics of the polymer interlayer.

SUMMARY OF THE INVENTION

The present invention includes polymer interlayers that are used in multiple layer glazing panels. Interlayers of the present invention comprise a thermoplastic polymer, a plasticizer, a tungsten oxide agent, and a stabilizing agent that prevents the degradation of the tungsten oxide agent. Interlayers incorporating such components have improved ultraviolet light blocking character, and also maintain optical quality over time.

DETAILED DESCRIPTION

The present invention is directed to the stabilized use of a tungsten oxide agent in polymer layers that can be used, either singly or in stacks of multiple polymer layers, as multiple layer glazing interlayers.

As used herein, a "multiple layer glazing interlayer" means an interlayer that can be used in a glazing having more than one layer, for example, two panes of glass with an interlayer therebetween. Interlayers can consist of a single polymer layer or multiple layers combined. Glazing panels can be used, for example, in automotive windshields and architectural applications.

As is disclosed herein, a tungsten oxide agent and a stabilizing agent are incorporated in polymer layers that are useful as interlayers—or as layers within interlayers—for use in multiple layer glazing panel applications. As will be described in detail below, polymer layers of the present invention can comprise any suitable thermoplastic polymer, and, in preferred embodiments, polymer layers comprise poly(vinyl butyral).

Polymer layers of the present invention incorporate a tungsten oxide agent as an infrared absorbing agent. A tungsten oxide agent can be dispersed in or on any one or more polymer layers of an interlayer. A tungsten oxide agent can be mixed directly into or disposed directly on a polymer layer by any suitable method as is known in the art, for example, but not limited to, addition during manufacture of an individual layer or dipping, spraying, or other topical treatment after manufacture.

In various embodiments, the tungsten oxide agent is incorporated directly into the bulk of a polymer prior to formation of a polymer layer. In these embodiments, a tungsten oxide agent can be incorporated into the polymer so as to provide a polymer layer having a weight percentage amount of tungsten oxide agent of less than 1.0%, 0.8%, 0.6%, or 0.4%, or 0.01% to 1.0%, 0.05% to 0.5%, or 0.1% to 0.3%. In a preferred embodiment, tungsten oxide agent pigment is incorporated into the bulk of a polymer layer. In various embodiments, more than one type of solar absorbing pigment is included in a single or in multiple polymeric layers.

In general, a tungsten oxide agent will be incorporated into and/or disposed on a polymer layer in an amount sufficient to achieve the desired infrared absorption effect. As will be appreciated by those of skill in the art, this amount will vary, depending on the other components and pigments. In various embodiments, a single polymeric layer will have sufficient tungsten oxide agent to prevent the transmission though the layer of at least 40%, 60%, 80%, 95%, or 99% of infrared radiation in the 800 nanometer to 2500 nanometer range, or 70% to 95% of near infrared light in that range.

In order to minimize visible light scattering (haze) the tungsten oxide agents can be less than 150 nanometers, less than 100 nanometers, or less than 50 nanometers.

In addition to the tungsten oxide agent, polymer layers of the present invention incorporate a stabilizing agent to prevent a blue color shift in the polymer layer due to aging effects of the tungsten oxide agent. It various embodiments of the present invention, a molecule having a benzotriazole group, a multivalent metal salt such as magnesium bis(2-ethylbutyrate), or both are incorporated into the polymer layer along with the tungsten oxide agent.

A molecule having a benzotriazole group can be incorporated in any suitable amount, and, in various embodiments, a molecule having a benzotriazole group is incorporated at 0.05 to 1.0 phr or 0.2 to 0.8 phr. A molecule having a benzotriazole group can be incorporated in any suitable manner, for example, through direct mixing with a polymer melt. Molecules having a benzotriazole group are available commercially, for example, as Tinuvin 326® and Tinuvin 328® (Ciba Specialty Chemicals, Basel, Switzerland).

As used herein, a "molecule having a benzotriazole group" means a molecule having the following group within its structure:

Formula I—benzotriazole:

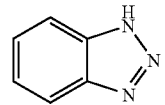

Examples of molecule having a benzotriazole group that are useful with the present invention include, without limitation:

Formula II, Tinuvin 328®:

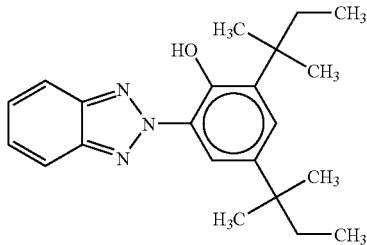

and,

Formula III, Tinuvin 326®:

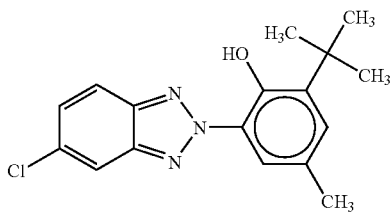

A multivalent metal salt such as magnesium bis(2-ethylbutyrate) can be incorporated in any suitable amount as well, and, in various embodiments, is incorporated at 0.009% to 0.1%, or 0.05% to 0.075%. The multivalent metal salt can be incorporated in any suitable manner, for example, through direct mixing with a polymer melt. Other magnesium salts can be used, and, in various embodiments, any suitable multivalent metal salt can be used.

In other embodiments both a molecule having a benzotriazole group and a multivalent metal salt, such as magnesium bis(2-ethylbutyrate), are incorporated into a polymer layer comprising a tungsten oxide agent.

In various embodiments of the present invention, a tungsten oxide agent is disposed in a polymer layer that is incorporated in an interlayer. In these embodiments the interlayer can comprise only the single polymer layer or can be a multiple layer interlayer comprising the polymer layer. Embodiments in which multiple layer interlayers are used include those that are known in the art, and include, for example and without limitation, interlayers having two or more polymer layers laminated together to form a single interlayer, and interlayers having one or more polymer layers laminated together with one or more polymer films, which will be described in detail below. In any of these embodiments, the tungsten oxide agent can be disposed in any one or more of the polymer layers, and the various layers can be the same or different.

Exemplary multiple layer interlayer constructs include the following:

(polymer layer)$_n$ (polymer layer/polymer film/polymer layer)$_p$ where n is 1 to 10 and, in various embodiments, is less than 5, and p is 1 to 5, and, in various embodiments, is less than 3.

Interlayers of the present invention can be incorporated into multiple layer glazing panels, and, in various embodiments, are incorporated between two layers of glass. Applications for such constructs include automobile windshields and architectural glass, among others.

In various embodiments of the present invention, interlayers comprising a tungsten oxide agent are used in bilayers. As used herein, a bilayer is a multiple layer construct having a rigid substrate, such as glass or acrylic, with an interlayer disposed thereon. A typical bilayer construct is: (glass)// (polymer layer)//(polymer film). Bilayer constructs include, for example and without limitation:

(glass)//((polymer layer)$_h$//(polymer film))$_g$ (glass)//(polymer layer)$_h$//(polymer film)

where h is 1 to 10, and, in various embodiments is less than 3, and g is 1 to 5, and, in various embodiments, is less than 3.

1 In further embodiment, interlayers as just described can be added to one side of a multiple layer glazing panel to act as a spall shield, for example and without limitation:

(Multiple Layer Glazing panel)//((polymer layer)$_h$//(polymer film))$_g$ (Multiple Layer Glazing panel)//(polymer layer)$_h$//(polymer film)

where h is 1 to 10, and, in various embodiments is less than 3, and g is 1 to 5, and, in various embodiments, is less than 3.

Tungsten Oxide Agents

Tungsten oxide agents of the present invention include those described by the general formula $W_yO_z$, where W is tungsten, O is oxygen, satisfying $2.0 < z/y < 3.0$, $2.2 \leq z/y \leq 2.99$, or $2.45 \leq z/y \leq 2.99$, and/or particles of composite tungsten oxide expressed by the general formula $M_xW_yO_z$ where M is an element selected from H, He, alkali metals, alkaline-earth metals, rare-earth metals, Mg, Zr, Cr, Mn, Fe, Rh, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, W is tungsten, O is oxygen, satisfying $0.001 \leq x/y \leq 1.0$ or $0.01 \leq x/y \leq 0.5$, and $2.0 \leq z/y \leq 3.0$, $2.2 \leq z/y \leq 2.99$, or $2.45 \leq z/y \leq 2.99$. Examples of tungsten/oxygen ratios include, without limitation, $WO_{2.92}$, $WO_{2.90}$, $W_{20}O_{58}$, $W_{24}O_{68}$, $W_{17}O_{47}$, $W_{18}O_{49}$, and the like. In preferred embodiments, the tungsten oxide agent is cesium tungsten oxide ($CsWO_3$) having any of the above described characteristics, and, in various embodiments, a cesium tungsten oxide agent having the mole ratio $Cs_{0.33}WO_3$ is used.

Polymer Film

As used herein, a "polymer film" means a relatively thin and rigid polymer layer that functions as a performance enhancing layer. Polymer films differ from polymer layers, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers, and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly (ethylene terephthalate) film that can be used with the present invention are disclosed in published European Application No. 0157030. Polymer films of the present invention can also include a hardcoat and/or and antifog layer, as are known in the art.

Polymer Layer

The following section describes the various materials, such as poly(vinyl butyral), that can be used to form polymer layers of the present invention comprising the tungsten oxide agent described elsewhere herein.

As used herein, a "polymer layer" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and, optionally, other additives. Components can be measured in parts per hundred resin parts, or "phr". As used herein parts per hundred resin (phr) parts, on a weight per weight basis. For example, if 30 grams of plasticizer is added to 100 grams of polymer resin, then the plasticizer content of the resulting plasticized polymer would be 30 phr.

The polymer layers of the present invention can comprise any suitable polymer, and, in a preferred embodiment, as exemplified above, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives, including plasticizers, disclosed herein can be used with the polymer layer having a polymer consisting of or consisting essentially of poly(vinyl butyral).

In one embodiment, the polymer layer comprises a polymer based on partially acetalized poly(vinyl alcohol)s. In another embodiment, the polymer layer comprises a polymer selected from the group consisting of poly(vinyl butyral), poly(vinyl chloride), poly(ethylene-co-vinyl acetate), poly (ethylene-co-ethyl acrylate), ionomers of partially neutralized ethylene/(meth)acrylic acid copolymer (such as Surlyn® from DuPont), polyethylene, polyethylene copolymers, polyurethane, or poly(cyclohexanedimethylene terephthalate-co-ethylene terephthalate) copolyester. In various embodiments, the polymer layer comprises poly(vinyl butyral), polyurethane, poly(vinyl chloride), poly(ethylene vinyl acetate), or combinations thereof. In further embodiments the polymer layer comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful components in polymer layers.

For embodiments comprising poly(vinyl butyral), the poly (vinyl butyral) can be produced by known acetalization processes, as are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, the polymer layer resin comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly (vinyl alcohol). The polymer layer resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, for example, a 2-ethyl hexanal group (see, for example, U.S. Pat. No. 5,137,954).

In various embodiments, the polymer layer comprises poly (vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be used in polymer layers of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

Other additives may be incorporated into the polymer layer to enhance its performance in a final product. Such additives include, but are not limited to, dyes, pigments, stabilizers (e.g., ultraviolet stabilizers), antioxidants, antiblock agents, additional IR absorbers, flame retardants, combinations of the foregoing additives, and the like, as are known in the art.

In various embodiments of polymer layers of the present invention, the polymer layers can comprise 20 to 60, 25 to 60, 20 to 80, 10 to 70, or 10 to 100 parts plasticizer phr. Of course other quantities can be used as is appropriate for the particular application. In some embodiments, the plasticizer has a hydrocarbon segment of fewer than 20, fewer than 15, fewer than 12, or fewer than 10 carbon atoms. The amount of plasticizer can be adjusted to affect the glass transition temperature ($T_g$) of the poly(vinyl butyral) layer. In general, higher amounts of plasticizer are added to decrease the $T_g$.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, mixtures of phosphates and adipates such as disclosed in U.S. Pat. No. 3,841,890, adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In various embodiments, the plasticizer used is dihexyl adipate and/or triethylene glycol di-2 ethylhexanoate.

The poly(vinyl butyral) polymer, plasticizer, and any additives can be thermally processed and configured into sheet form according to methods known to those of ordinary skill in the art. One exemplary method of forming a poly(vinyl butyral) layer comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet. In various embodiments, the polymer layers can have thicknesses of, for example, 0.1 to 2.5 millimeters, 0.2 to 2.0 millimeters, 0.25 to 1.75 millimeters, and 0.3 to 1.5 millimeters.

For each embodiment described above comprising a glass layer, another embodiment exists, where suitable, wherein a non-glass glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Also included in the present invention are stacks or rolls of any of the polymer layers and interlayers of the present invention disclosed herein in any combination.

The present invention also includes windshields, windows, and other finished glazing products comprising any of the interlayers of the present invention.

The present invention includes methods of manufacturing interlayers and glazing panels comprising forming an interlayer or glazing panel of the present invention using any of the polymer layers of the present invention described herein.

Various polymer layer and/or laminated glass characteristics and measuring techniques will now be described for use with the present invention.

The clarity of laminated glass comprising a polymer layer, can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. For laminated glass panels of the present invention, various embodiments have a pummel of at least 3, at least 5, at least 8, at least 9, or 10. Other embodiments have a pummel between 8 and 10, inclusive.

The "yellowness index" of a polymer layer can be measured according to the following: transparent molded disks of polymer layer 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer layer can have a yellowness index of 12 or less, 10 or less, or 8 or less.

EXAMPLES

Example 1

Seven polymer layers are prepared having a thickness of 0.76 millimeters (30 mils), 38 phr triethylene glycol bis(2-ethylhexanoate) plasticizer, and the amounts of $CsWO_3$, Tinuvin 328®, Tinuvin 622® (a hindered amine light stabilizer), and Magnesium bis(2-ethylbutyrate) indicated in Table 1, and are laminated between two sheets of clear glass.

Table 1 shows the change in visible light transmittance (Delta Tv=Final Tv−Initial Tv) after exposure to ultraviolet radiation in a weatherometer for 500 hours. The weatherometer is a model Xenon Arc Atlas Ci65 (Atlas Material Testing Technology LLC, Chicago, Ill.) operating with the following settings: irradiance, 0.55 W/m², black panel temp 70° C.; water spray, none; filters—inner, quartz; and, filters—outer, borosilicate (type S).

TABLE 1

| CsWO₃ Weight % | Tinuvin 328 ® Weight % | Tinuvin 622 ® Weight % | Magnesium bis(2-ethylbutyrate) Weight % | Delta Tv (%) |
|---|---|---|---|---|
| 0 | 0 | 1.16 | 0 | −0.3 |
| 0.3 | 0 | 0 | 0 | −42.8 |
| 0.3 | 0 | 0 | 0.037 | −22.3 |
| 0.3 | 0 | 1.16 | 0.037 | −21.3 |
| 0.3 | 0 | 2.3 | 0.037 | −24.8 |
| 0.3 | 0.18 | 1.16 | 0.037 | −6.0 |
| 0.3 | 0.36 | 1.16 | 0.037 | −4.6 |

Example 2

A polymer layer is formed having a thickness of 0.76 millimeters (30 mils), 38 phr triethylene glycol bis(2-ethylhexanoate) plasticizer, 0.05% weight percent CsWO₃, 0.046 weight percent Magnesium bis(2-ethylbutyrate), and various amounts of Tinuvin 326® as shown in Table 2, and is laminated between two sheets of clear glass. Delta Tv is measured as in Example 1.

TABLE 2

| Wt. % Tinuvin 326 ® | Delta Tv |
|---|---|
| 0 | −2.3 |
| 0.18 | −0.1 |
| 0.36 | −0.2 |
| 0.72 | −0.1 |

By virtue of the present invention, it is now possible to provide interlayers, such as poly(vinyl butyral) interlayers, with a tungsten oxide agent having improved optical characteristics without an unacceptable reduction in optical quality over time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising a tungsten oxide agent in any of the ranges given in addition to comprising plasticizer in any of the ranges given, where appropriate, to form many permutations that are within the scope of the present invention, but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

I claim:

1. An interlayer for use in a multiple layer glazing, comprising:
   poly(vinyl butyral);
   a tungsten oxide agent;
   a sole ultraviolet absorber selected from the group consisting of: a molecule having the structural formula

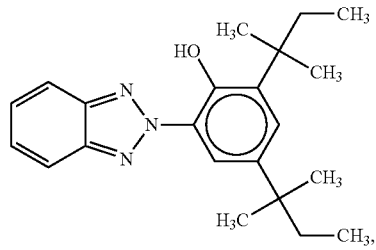

a molecule having the structral formula

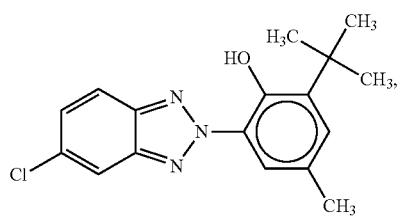

and combination thereof; and
a multivalent metal salt;
wherein the sole ultraviolet absorber and the multivalent metal salt are added in an effective amount to reduce the interlayer's decrease in visible light transmittance to about six percent or less, after the interlayer has had exposure to ultraviolet radiation in a weatherometer for 500 hours, and to thereby inhibit a blue color shift due to ageing effects of the tungsten oxide agent in said interlayer; and
wherein said interlayer comprises 0.05 to 0.5 weight percent of said tungsten oxide agent.

2. The interlayer of claim 1, wherein said interlayer comprises 0.05 to less than about 0.1 weight percent of said tungsten oxide agent.

3. The interlayer of claim 1, wherein said tungsten oxide agent is described by the general formula $W_yO_z$, wherein W is tungsten, O is oxygen, and satisfying $2.0 < z/y < 3.0$, and those described by the general formula $M_xW_yO_z$ where M is an element selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, and Re, W is tungsten, O is oxygen, and satisfying $0.001 \leq x/y \leq 1.0$ and $2.0 \leq z/y \leq 3.0$.

4. The interlayer of claim 1, wherein said tungsten oxide is present in an amount sufficient to block 70% to 95% of near infrared light.

5. The interlayer of claim 1, wherein said tungsten oxide is present in an amount sufficient to block 95% or more of infrared radiation in the 800 nanometer to 2500 nanometer range.

6. The interlayer of claim 1, wherein the interlayer's decrease in visual light transmittance is effectively reduced to about two percent or less, after the interlayer has had exposure to ultraviolet radiation in a weatherometer for 500 hours.

7. The interlayer of claim 1, wherein the interlayer's decrease in visual light transmittance is effectively reduced to about 0.2 percent or less, after the interlayer has had exposure to ultraviolet radiation in a weatherometer for 500 hours.

8. A multiple layer glazing panel, comprising:
a sheet of glass; and,
an interlayer in contact with said sheet of glass, where said interlayer comprises:
poly(vinyl butyral);
a tungsten oxide agent;
a sole ultraviolet absorber selected from the group consisting of: a molecule having the structural formula

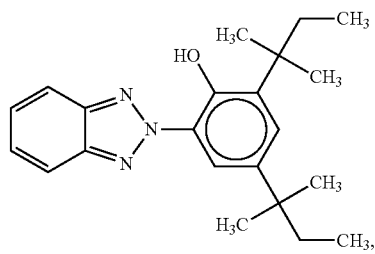

a molecule having the structral formula

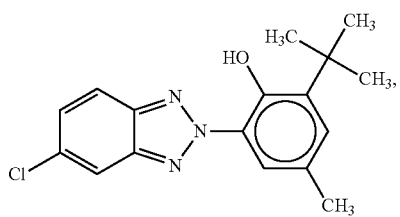

and combination thereof; and
magnesium bis(2-ethylbutyrate);
wherein the sole ultraviolet absorber and magnesium bis(2-ethylbutyrate) are added in an effective amount to reduce the interlayer's decrease in visible light transmittance to about six percent or less, after the interlayer has had exposure to ultraviolet radiation in a weatherometer for 500 hours, and to thereby inhibit a blue color shift due to ageing effects of the tungsten oxide agent in said interlayer; and
wherein said interlayer comprises 0.05 to 0.5 weight percent of said tungsten oxide agent.

9. The panel of claim 8, wherein said interlayer comprises 0.05 to less than about 0.1 weight percent of said tungsten oxide agent.

10. The panel of claim 8, wherein said tungsten oxide agent is described by the general formula $W_yO_z$, wherein W is tungsten, O is oxygen, and satisfying $2.0<z/y<3.0$, and those described by the general formula $M_xW_yO_z$ where M is an element selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re, W is tungsten, O is oxygen, and satisfying $0.001 \leqq x/y \leqq 1.0$ and $2.0 \leqq z/y \leqq 3.0$.

11. The panel of claim 8, wherein said tungsten oxide is present in an amount sufficient to block 70% to 95% of near infrared light.

12. The panel of claim 8, wherein the interlayer's decrease in visual light transmittance is effectively reduced to about two percent or less, after the interlayer has had exposure to ultraviolet radiation in a weatherometer for 500 hours.

13. An interlayer for use in a multiple layer glazing, comprising:
poly(vinyl butyral);
a tungsten oxide agent;
a sole ultraviolet absorber selected from the group consisting of: a molecule having the structural formula

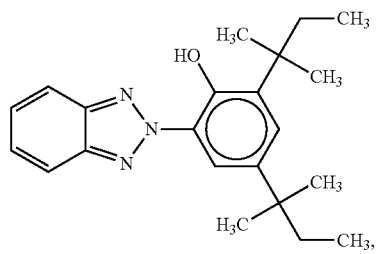

a molecule having the structural formula

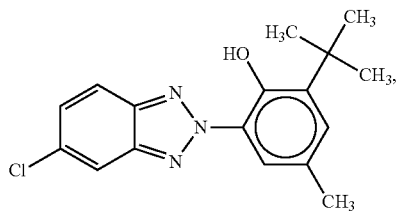

and combination thereof; and
magnesium bis(2-ethylbutyrate);
wherein the sole ultraviolet absorber and magnesium bis(2-ethylbutyrate) are added in an effective amount reduce the interlayer's decrease in visible light transmittance to about six percent to about one tenth of a percent, after the interlayer has had exposure to ultraviolet radiation in a weatherometer for 500 hours, and to thereby inhibit a blue color shift due to ageing effects of the tungsten oxide agent in said interlayer; and
wherein said interlayer comprises 0.05 to 0.5 weight percent of said tungsten oxide agent.

14. An interlayer for use in a multiple layer glazing, comprising:

poly(vinyl butyral);

cesium tungsten oxide;

a sole ultraviolet absorber selected from the group consisting of: a molecule having the structural formula

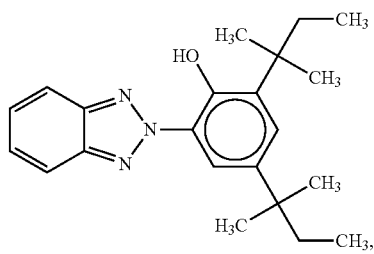

a molecule having the structural formula

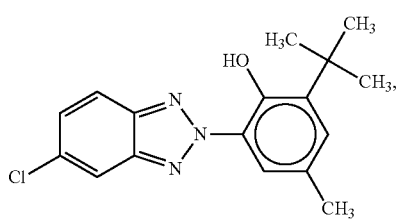

and combination thereof; and a multivalent metal salt;

wherein the sole ultraviolet absorber and the multivalent metal salt are added in an effective amount to reduce the interlayer's decrease in visible light transmittance to about six percent to about one tenth of a percent, after the interlayer has had exposure to ultraviolet radiation in a weatherometer for 500 hours, and to thereby inhibit a blue color shift due to ageing effects of the cesium tungsten oxide in said interlayer; and wherein said interlayer comprises 0.05 to 0.5 weight percent of said tungsten oxide agent.

15. An interlayer for use in a multiple layer glazing, comprising:

poly(vinyl butyral);

cesium tungsten oxide;

magnesium bis(2-ethylbutyrate); and a sole ultraviolet absorber having the structure:

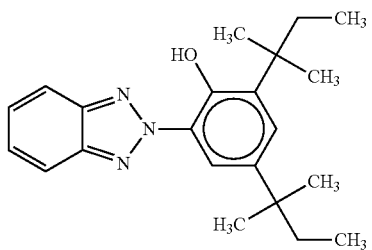

wherein magnesium bis(2-ethylbutyrate) and the sole ultraviolet absorber having the above structure are added in an effective amount to reduce the interlayer's decrease in visible light transmittance to about six percent to about one tenth of a percent, after the interlayer has had exposure to ultraviolet radiation in a weatherometer for 500 hours, and to thereby inhibit a blue color shift due to ageing effects of the cesium tungsten oxide in said interlayer; and wherein said interlayer comprises 0.05 to 0.5 weight percent of said tungsten oxide agent.

16. An interlayer for use in a multiple layer glazing, comprising:

poly(vinyl butyral);

cesium tungsten oxide;

magnesium bis(2-ethylbutyrate); and a sole ultraviolet absorber having the structure:

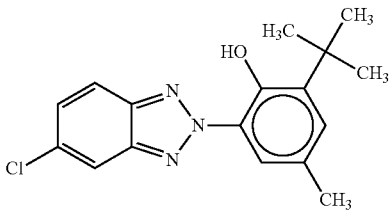

wherein magnesium bis(2-ethylbutyrate) and the sole ultraviolet absorber having the structure above are added in an effective amount to reduce the interlayer's decrease in visible light transmittance to about six percent to about one tenth of a percent, after the interlayer has had exposure to ultraviolet radiation in a weatherometer for 500 hours, and to thereby inhibit a blue color shift due to ageing effects of the cesium tungsten oxide in said interlayer; and wherein said interlayer comprises 0.05 to 0.5 weight percent of said tungsten oxide agent.

* * * * *